US010783432B2

(12) United States Patent
Gokmen et al.

(10) Patent No.: US 10,783,432 B2
(45) Date of Patent: Sep. 22, 2020

(54) UPDATE MANAGEMENT FOR RPU ARRAY (71) Applicant: INTERNATIONAL BUSINESS MACHINES CORPORATION, Armonk, NY (US)

(72) Inventors: Tayfun Gokmen, Briarcliff Manor, NY (US); Oguzhan Murat Önen, Ankara (TR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 753 days.

(21) Appl. No.: 15/487,701

(22) Filed: Apr. 14, 2017

(65) Prior Publication Data

US 2018/0300622 A1 Oct. 18, 2018

(51) Int. Cl.
| | |
|---|---|
| *G06N 3/08* | (2006.01) |
| *G06F 7/544* | (2006.01) |
| *G06N 3/063* | (2006.01) |
| *G06N 3/04* | (2006.01) |
| *G06F 5/01* | (2006.01) |
| *G06F 17/16* | (2006.01) |

(52) U.S. Cl.
CPC ............ *G06N 3/08* (2013.01); *G06F 5/01* (2013.01); *G06F 7/5443* (2013.01); *G06F 17/16* (2013.01); *G06N 3/04* (2013.01); *G06N 3/063* (2013.01); *G06N 3/084* (2013.01); *G06F 2207/4814* (2013.01); *G06F 2207/4824* (2013.01); *G06F 2207/4828* (2013.01)

(58) Field of Classification Search
None
See application file for complete search history.

(56) References Cited

U.S. PATENT DOCUMENTS

| | | | |
|---|---|---|---|
| 5,258,934 | A | 11/1993 | Agranat et al. |
| 2004/0083193 | A1 | 4/2004 | Shi et al. |
| 2015/0170025 | A1 | 6/2015 | Wu et al. |
| 2016/0049195 | A1 | 2/2016 | Yu et al. |
| 2017/0061281 | A1 | 3/2017 | Gokmen et al. |
| 2017/0091616 | A1 | 3/2017 | Gokemen et al. |
| 2017/0091618 | A1 | 3/2017 | Gokmen et al. |

OTHER PUBLICATIONS

Gokmen et al. ("Acceleration of Deep Neural Network Training with Resistive Cross-Point Devices"), Mar. 2016.*
Chaturvedi ("Soft Computing: Techniques and its Applications in Electrical Engineering"), 2008.*
Lei Ba et al. ("Layer Normalization"), Jul. 2016.*

(Continued)

*Primary Examiner* — Alexey Shmatov
*Assistant Examiner* — Hansol Doh
(74) *Attorney, Agent, or Firm* — Tutunjian & Bitetto, P.C.; Vazken Alexanian (57) ABSTRACT

A computer-implemented method and computer processing system are provided for update management for a neural network. The method includes performing an isotropic update process on the neural network using a Resistive Processing Unit. The isotropic update process uses a multiplicand and a multiplier from a multiplication operation. The performing step includes scaling the multiplicand and the multiplier to have a same order of magnitude.

14 Claims, 7 Drawing Sheets

(56) References Cited

OTHER PUBLICATIONS

Braendler et al. ("Deterministic bit-stream digital neurons"), Dec. 2002.*
International Search Report and Written Opinion dated Jul. 3, 2018 for International Application No. PCT/IB2018/051644, 9 pages.
Bichler, et al., "Design Exploration Methodology for Memristor-Based Spiking Neuromorphic Architectures with the Xnet Event-Driven Simulator", 2013 IEEE/ACM International Symposium on Nanoscale Architectures (Nanoarch), Jul. 2013, 6 pages.
Bojnordi, et al., "Memristive Boltzmann Machine: A Hardware Accelerator for Combinatorial Optimization and Deep Learning", IEEE International Symposium on High Performance Computer Architecture (HPCA), Apr. 2016, 13 pages.
Chi et al., "Prime: A Novel Processing-in-memory Architecture for Neural Network Computation in ReRAM-based Main Memory", 43rd Annual International Symposium on Computer Architecture (ISCA), Jun. 2016.

* cited by examiner

UPDATE MANAGEMENT FOR RPU ARRAY

BACKGROUND

Technical Field

The present invention relates generally to resistive processing units and, in particular, to update management for a Resistive Processing Unit (RPU) array.

Description of the Related Art

A Resistive Processing Unit (RPU) is an array of resistive devices that can be used for deep neural network training. A RPU is composed of fully connected layers, convolution layers, recurrent layers, and so forth. However, the updating of a RPU can be time and resource intensive. Thus, there is a need for improvements in updating a RPU.

SUMMARY

According to an aspect of the present invention, a computer-implemented method is provided for update management for a neural network. The method includes performing an isotropic update process on the neural network using a Resistive Processing Unit. The isotropic update process uses a multiplicand and a multiplier from a multiplication operation. The performing step includes sealing the multiplicand and the multiplier to have a same order of magnitude.

According to another aspect of the present invention, a computer program product is provided for update management for a neural network. The computer program product includes a non-transitory computer readable storage medium having program instructions embodied therewith. The program instructions are executable by a computer to cause the computer to perform a method. The method includes performing art isotropic update process on the neural network using a Resistive Processing Unit. The isotropic update process uses a multiplicand and a multiplier from a multiplication operation. The performing step includes scaling the multiplicand and the multiplier to have a same order of magnitude.

According to yet another aspect of the present invention, a computer processing system is provided for update management for a neural network. The computer processing system includes a Resistive Processing Unit (RPU) configured to perform an isotropic update process on the neural network. The isotropic update process uses a multiplicand and a multiplier from a multiplication operation. The RPU is configured to perform the isotropic update process by scaling the multiplicand and the multiplier to have a same order of magnitude.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to update management for a Resistive Processing Unit (RPU) array.

In an embodiment, an isotropic update scheme is proposed for a RPU in order to fully exploit the update cycle of the RPU, by increasing overall performance while using the least amount of cycles needed for training at the same time.

The present invention can apply to any of stochastic bit streams and deterministic bit streams.

In an embodiment, an update scheme proposed for RPU includes populating stochastic bit streams and using coinciding ones of the stochastic bit streams to perform the update.

In an embodiment, the present invention conditions the inputs before running a stochastic update cycle in order to remove false spatial correlation resulting from having to multiply two numbers that are multiple orders of magnitude different than each other. That is, in an embodiment, multiplicands in a stochastic update scheme have the same order of magnitude. Using this method, RPU test accuracy improves significantly for CNN and DNN training, using a single iteration for completing the RPU array update that accelerates the update cycle.

Using the shortest stream of bits makes the update cycle as fast as possible. This case corresponds to BL=1, where the update cycle is operated through a single pulse (making maximum and minimum possible updates the same, while still remaining probabilistic with respect to the $x_i \delta_j$ values).

To employ this single pulse window as efficiently as possible, we propose a method to do the update in a more isotropic way.

In an embodiment, the present invention can resolve a problem caused by hardware imperfection. In an embodiment, the present invention decreases the effect of resistive elements (in a RPU) with asymmetric behavior by decreasing the correlation between the nodes. The present invention can involve scaling values in order to increase stochasticity and minimize the device imperfection effects on the test results.

While one or more embodiments are described herein relating to the use of stochastic update pulses, the present invention is readily applied to deterministic update pulses, as readily appreciated by one of ordinary skill in the art, given the teachings of the present invention provided herein, while maintaining the spirit of the present invention.

Figure 1:
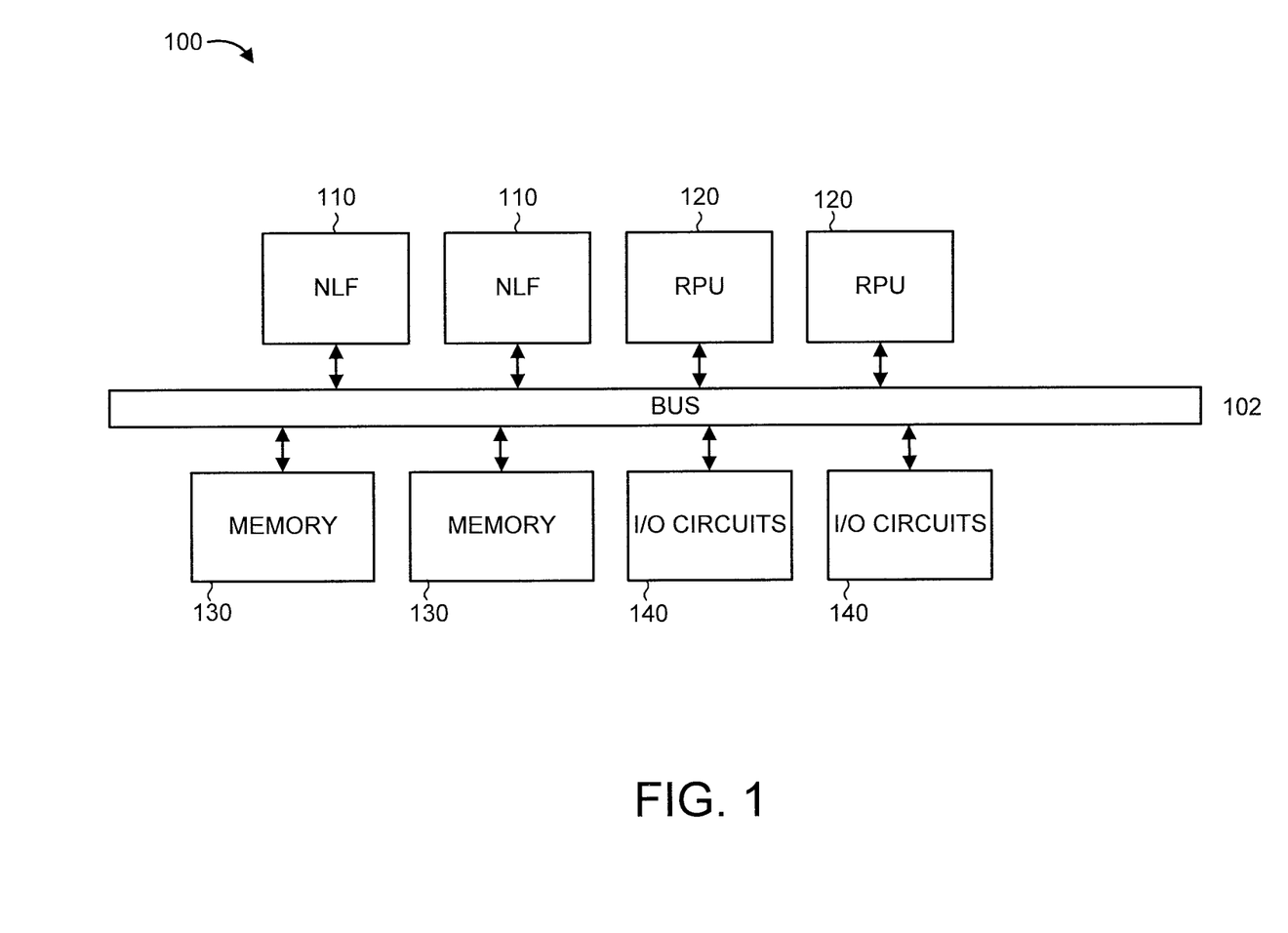
FIG. 1 shows all exemplary processing system to which the invention principles may be applied, in accordance with an embodiment of the present invention.

FIG. 1 shows an exemplary processing system 100 to which the invention principles may be applied, in accordance with an embodiment of the present invention.

The processing system 100 includes a bus 102 for interconnecting one or more Non-Linear Filters (NLFs) (collectively and individually denoted by the figure reference numeral 110), one or more Resistive Processing Units (RPUs) (collectively and individually denoted by the figure reference numeral 120), one or more memories (collectively and individually denoted by the figure reference numeral 130), and one or more input/output (I/O) circuits (collectively and individually denoted by the figure reference numeral 140).

In the case of an Integrated Circuit (IC) implementation of processing system 100, on-chip communication can be provided by the bus 102, while off-chip communication can be provided by the I/O circuits 140.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional RPUs, processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
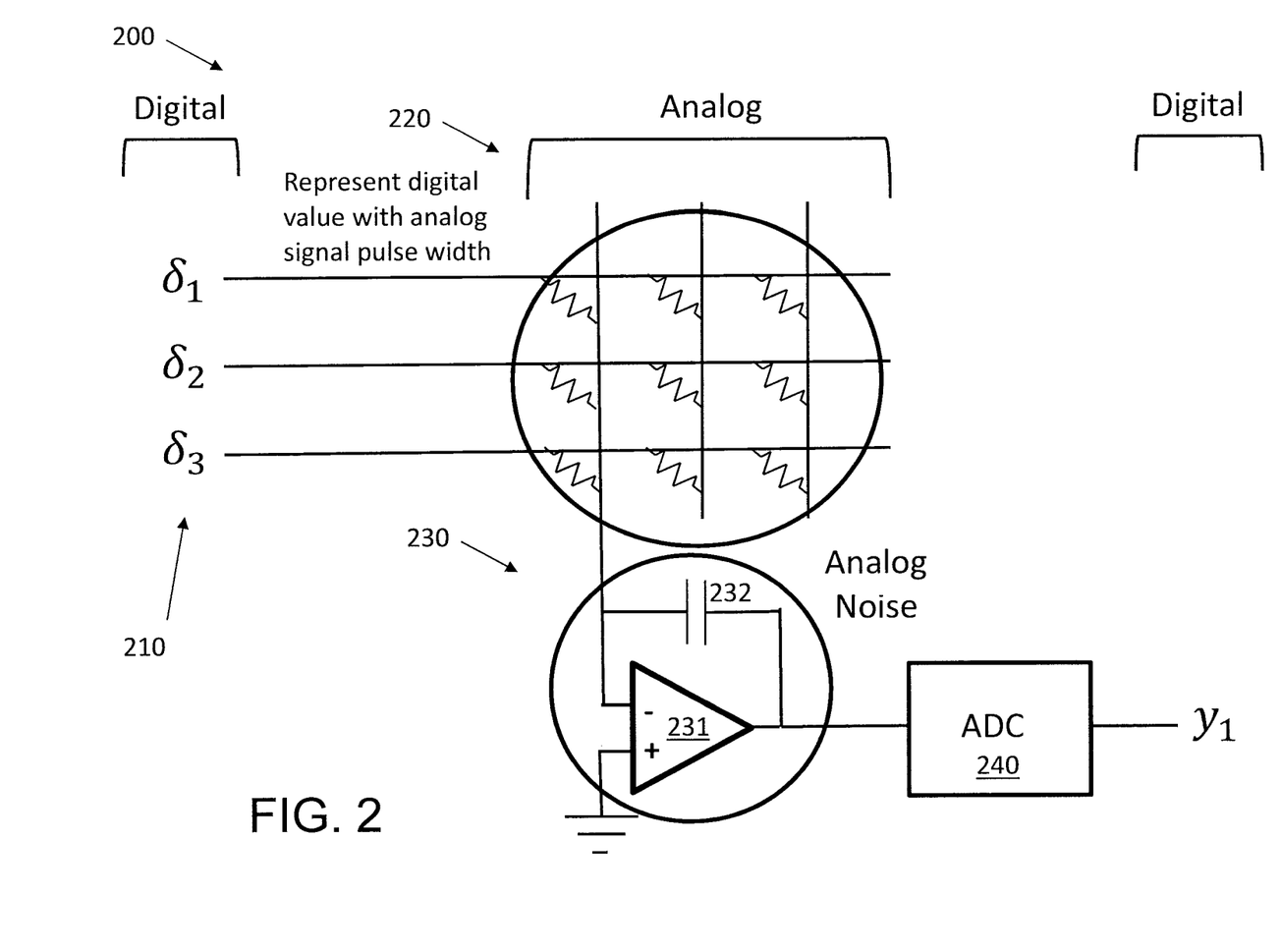
FIG. 2 shows an exemplary analog vector-matrix multiplication on a RPU array, in accordance with an embodiment of the present invention.

FIG. 2 shows an exemplary analog vector-matrix multiplication 200 on a RPU array, in accordance with an embodiment of the present Invention.

The analog vector-matrix multiplication 200 involves a set of digital input values ($\delta$) 210, where each of the digital input values ($\delta$) 210 is represented by a respective analog signal pulse width 220. The analog signal pulse widths 220 are provided to an operational amplifier (op-amp) integrating circuit 230 having an op-amp 231 with a capacitor ($C_{int}$) 232 connected to (across) the inverting input of the op-amp 231 and the output of the op-amp 231. The non-inverting input of the op-amp 231 is connected to ground. The output of the op-amp 231 is also connected to an input of an Analog-to-Digital Converter (ADC) 240. The ADC 240 outputs a signal y1, representing a (digitized) result of the analog vector-matrix multiplication 200 on the RPU array.

Figure 3:
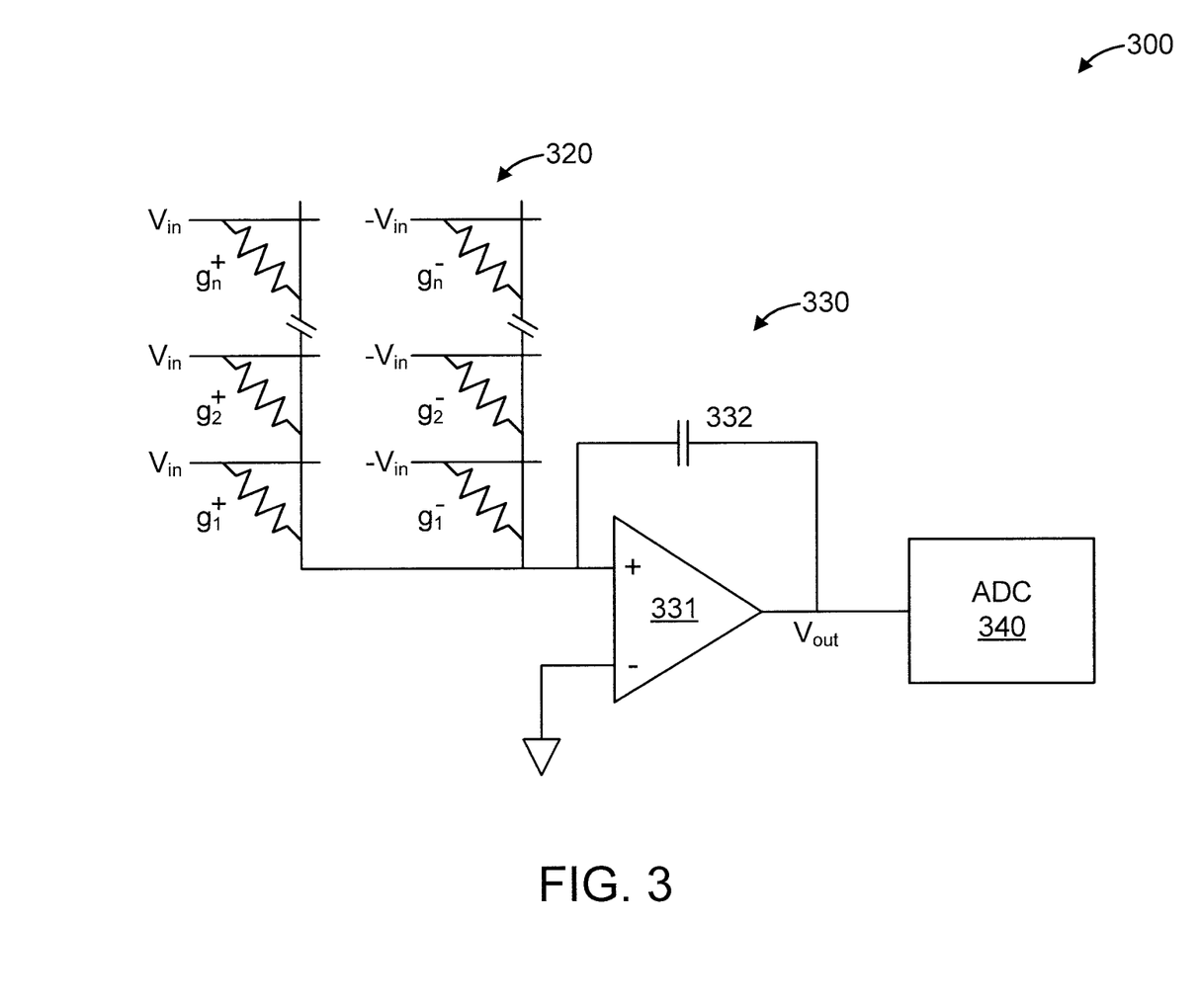
FIG. 3 shows another exemplary analog vector-matrix multiplication on a RPU array, in accordance with an embodiment of the present invention.

FIG. 3 shows another exemplary analog vector-matrix multiplication 300 on a RPU array, in accordance with an embodiment of the present invention. The multiplication 300 is essentially that shown in FIG. 2, using a different format (representation).

The analog vector-matrix multiplication 300 involves a set of input values 320 applied to an inverting input of an op-amp integrating circuit 330. The op-amp integrating circuit 330 includes an op-amp 331 with a capacitor ($C_{int}$) 332. The input values 320 correspond to an input voltage $V_{in}$ and corresponding transconductances $g_1^+$ through $g_n^+$ and $g_1^-$ through $g_n^-$. A non-inverting input of the op-amp 331 is connected to ground. The capacitor 332 is connected to (across) the inverting input of the op-amp 331 and the output of the op-amp 331. The output of the op-amp is also connected to an input of an Analog-to-Digital Converter (ADC) 340. The op amp 331 outputs a signal $V_{out}$, representing a result of the analog vector-matrix multiplication 300 on the RPU array. The ADC 340 converts the analog output $V_{out}$ from the op-amp 331 into a digital signal.

Figure 4:
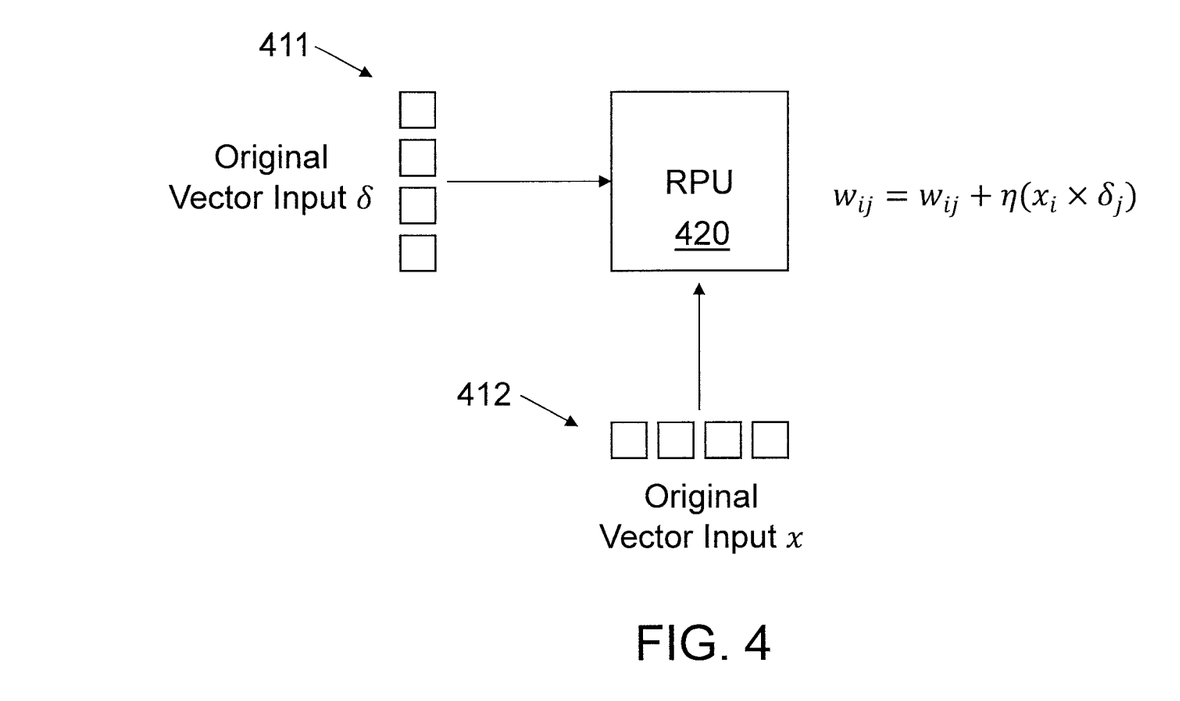
FIG. 4 shows an exemplary update operation to which the present invention can be applied, in accordance with an embodiment of the present invention.

FIG. 4 shows an exemplary update operation 400 to which the present invention can be applied, in accordance with an embodiment of the present invention.

The update operation 400 involves providing an original vector input $\delta$ 411 and an original vector input x 412 to a Resistive Processing Unit (RPU) 420. An output of the RPU 420 is provided as follows:

$$w_{ij}=w_{ij}+\eta(x_i \times \delta_j)$$

where $w_{ij}$ represents a weight of a connection between an $i^{th}$ row and a $j^{th}$ column, $\eta$ represents a learning rate (a scalar value), $x_i$ represents the activity at the input neuron, and $\delta_j$ represents the error computed by the output neuron.

In an embodiment, a RPU is trained using a backpropagation method that includes three cycles, namely a forward cycle, a backward cycle, and a weight update cycle (herein "weight update" in short). The forward and backward cycles mainly involve computing vector-matrix multiplication in the forward and backward directions. The present invention is essentially directed to the weight update cycle.

Figure 5:
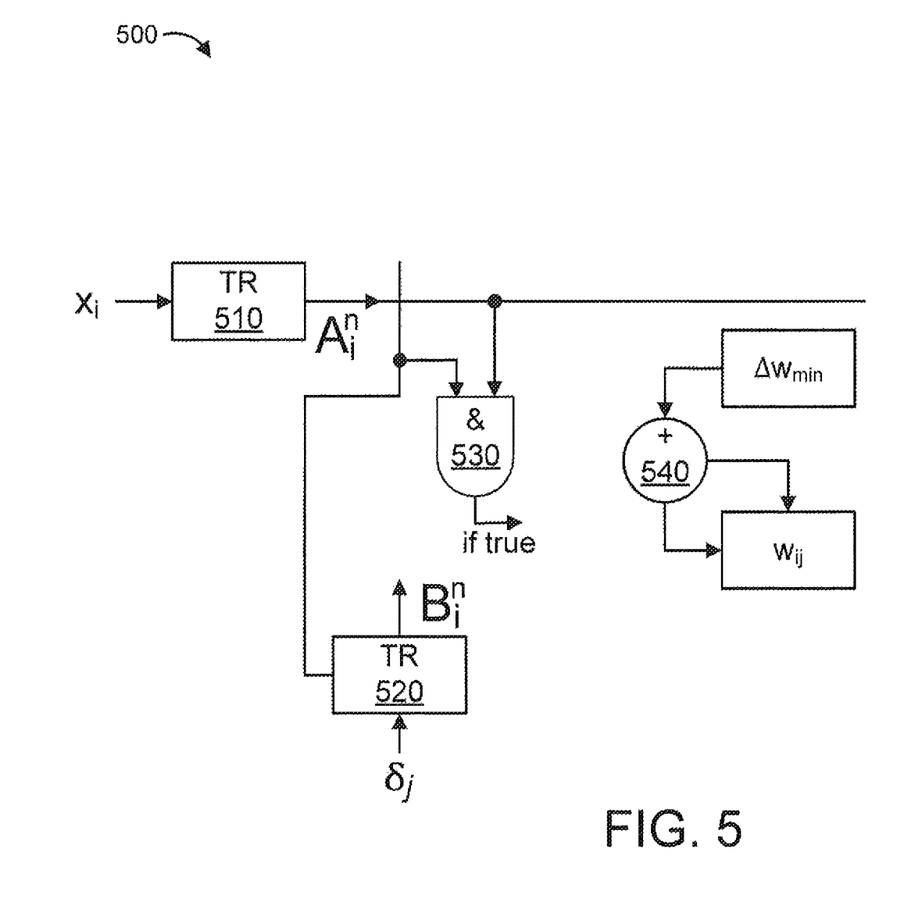
FIG. 5 shows a stochastic update rule circuit for a RPU array, to which the present invention can be applied, in accordance with an embodiment of the present invention.
Figure 6:
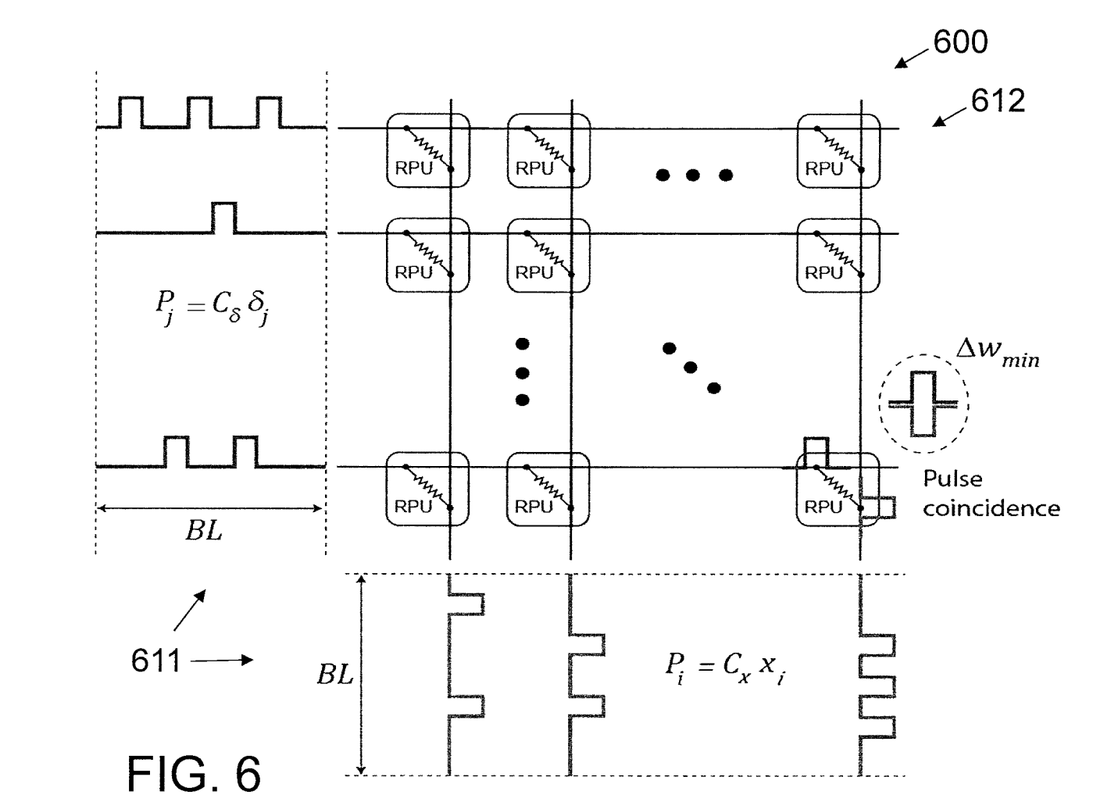
FIG. 6 shows an update cycle corresponding to the stochastic update rule circuit of FIG. 5, in accordance with an embodiment of the present invention.

FIG. 5 shows a stochastic update rule circuit 500 for a RPU array, to which the present invention can be applied, in accordance with an embodiment of the present invention. FIG. 6 shows an update cycle 600 corresponding to the update rule circuit 500 of FIG. 5, in accordance with an embodiment of the present invention.

The stochastic update rule circuit 500 includes a Translator (TR) 510, a TR 520, an AND (&) gate 530, and an adder 540. The TRs can be Stochastic Translators (STRs) or Deterministic Translators (DTRs). For the sake of illustration, the Translators (TRs) 510 and 520 are hereinafter referred to as Stochastic Translators (STRs) and will be described involving Stochastic streams. However, the STRs can be readily replaced by DTRs and used involving deterministic streams, as readily determined by one of ordinary skill in the art given the teachings of the present invention provided herein, while maintaining the spirit of the present invention.

The STR 510 receives an input $x_i$ and output $A_i^n$. Input $x_i$ represents the activity at the input neuron. $A_i^n$ denotes a random variable that is characterized by a Bernoulli process, and the superscript n denotes the bit position in the trial sequence.

The STR 520 receives an input $\delta_j$ and output $B_j^n$. Input $\delta_j$ represents the error computed by the output neuron. $B_j^n$ denotes a random variable that is characterized by a Bernoulli process, and the superscript n denotes the bit position in the trial sequence.

Each of the STRs 510 and 520 involves a parameter C, which is a STR amplification factor. In particular, STR 510 involves amplification factor $C_x$ for the x vector, and STR 520 involves amplification factor $C_\delta$ for the $\delta$ vector. Hence, the probabilities that $A_i^n$ and $B_j^n$ are given by $C_x x_i$ and $C_\delta \delta_j$, respectively. In an embodiment, the amplification factors $C_x$ and $C_\delta$ are controlled by a non-linear filter (e.g., NLF 110 of FIG. 1, and so forth).

The adder 540 receives inputs $\Delta w_{min}$ and $w_{ij}$, and outputs (an updated) $w_{ij}$. The parameter $\Delta w_{min}$ corresponds to an incremental conductance change on an RPU device due to a single coincidence event that translates into an incremental weight change. The conductance valise stored on an RPU device similarly translates in to a weight value.

A stochastic update role implemented by the stochastic update rule circuit 500 is as follows:

$$w_{ij} \leftarrow w_{ij} + \Delta w_{min} \sum_{n=1}^{BL} A_i^n \wedge B_j^n$$

where $w_{ij}$ denotes a weight of a connection between an $i^{th}$ row and a $j^{th}$ column, $\Delta w_{min}$ denotes an incremental conductance change (i.e., change in weight value) due to a single coincidence event (and is considered a device parameter that may be controlled by voltage), BL denotes the length of the stochastic bit stream (at the output of the STRs that is used during the update cycle), $A_i^n$ and $B_j^n$ denote random variables that are characterized by a Bernoulli process, and the superscript ft denotes the bit position in the trial sequence.

In the stochastic update rule circuit 500, numbers that are encoded from neurons ($x_i$ and $\delta_j$) are translated to stochastic bit streams by the STRs 510 and 520.

Increasing the stochastic bit stream length BL would decrease the error, but in turn would increase the update time. In an embodiment, an acceptable range of BL values, that allow reaching classification errors similar to a baseline model, is found as follows: perform training using different BL values while setting $$\Delta w_{min} = \frac{\eta}{BL} \text{ and } C = 1$$

in order to match the learning rates used for the baseline model. It has been determined that a value of BL as small as ten is sufficient for the stochastic model to become indistinguishable from the baseline model.

In addition, for the stochastic update rule, the change in the weight value for a single update cycle is bounded by BL $\Delta w_{min}$ and this condition may happen if the probabilities of generating pulses from the STRs 510 and 520 ($Cx_i$) and ($C\delta_j$) are close to unity or larger. The effect of this clipping in the weight update is also taken into account and does not degrade the performance for BL as small as ten, for example.

Moreover, the (global) learning rate η is an important hyper-parameter to be controlled.

The learning rate control is implemented by the following:

$$\eta \leftarrow BL \Delta w_{min} C^2$$

In the most general form, the average change in the weight value for the stochastic model can be written as follows:

$$\mathbb{E}(\Delta w_{ij}) = BL \Delta w_{min} C^2 x_i \delta_j$$

Therefore, the learning rate for the stochastic model is controlled by three parameters, namely BL and $\Delta w_{min}$ and C. These three parameters can be adjusted to match the learning rates that are used in the baseline model.

While the training goes on, δ values get smaller since the network becomes better (therefore the network needs less updates). On the other hand, x values ($\Delta w = \eta \times \delta$) become 1 or −1 due to the tan h activation functions used (If it were sigmoid, it would be 0 or 1).

The stochastic update rule (Coincidence Detection) works worse when the multiplicands are at different orders of magnitude (e.g., 1 and $10^{-6}$) which means a probability of having a "high" pulse in individual populations is greatly different (i.e., one is more or less certain while the other is quite impossible).

When a δ column fires, then all the nodes in that column get updated since x rows certainly fires (have values of 1 or −1). This causes an unreal spatial: correlation and harms the process.

In accordance with an embodiment of the present invention, values can be scaled, while maintaining their product to be the same, so that they are comparable (the same). For example, $$1 \times 10\text{-}6 = \frac{1}{10^3} \times (10^{-6} \times 10^3).$$

$$\eta \leftarrow BL \Delta w_{min} \left(\frac{C}{\gamma}\right)(C\gamma), \gamma = \sqrt{\frac{\max(x_i)}{\max(\delta_j)}}$$

where, in the preceding equation for η, "

$$\left(\frac{C}{\gamma}\right)$$

" represents $C_x$, and "(Cγ)" represents $C_\delta$.

In an embodiment, the Bit Length BL is reduced to one to allow the update cycle to be as short as possible.

The isotropic update scheme in accordance with the present invention increases test accuracy both in a Convolutional Neural Network (CNN) and Deep Neural Network (DNN) by removing false spatial correlation caused by a high difference in the order of magnitudes between x and δ values.

Using streams of similar probability of including "high" pulses increase the entropy of the update mechanism, providing a better result.

In an embodiment, all the operations relating to the present invention are done in the digital domain, without increasing circuit complexity.

Referring to FIG. 6, the following equations apply:

$$P_i = C_x x_i$$

$$P_j = C_\delta \delta_j.$$

In FIG. 6, update pulses (e.g., stochastic update pulses) 611 are applied to an RPU array 612. The probability of generating a pulse in a specific row j is given by $P_j$ which is controlled by a STR for that row. Similarly, the probability of generating a pulse in a specific column i is given, by $P_i$ which is controlled by a STR for that column. Some of those generated pulses from the $i^{th}$ column and the $j^{th}$ row may overlap (coincide) on an RPU device causing an incremental conductance change. This incremental conductance change is equivalent to an incremental weight change ($\Delta w_{min}$).

In the case of deterministic update pulses, the Stochastic Translators (STRs) can be replaced by DTRs Deterministic Translators (STRs), as readily appreciated by one of ordinary skill in the art, given the teachings of the present invention provided herein, while maintaining the spirit of the present invention.

Figure 7:
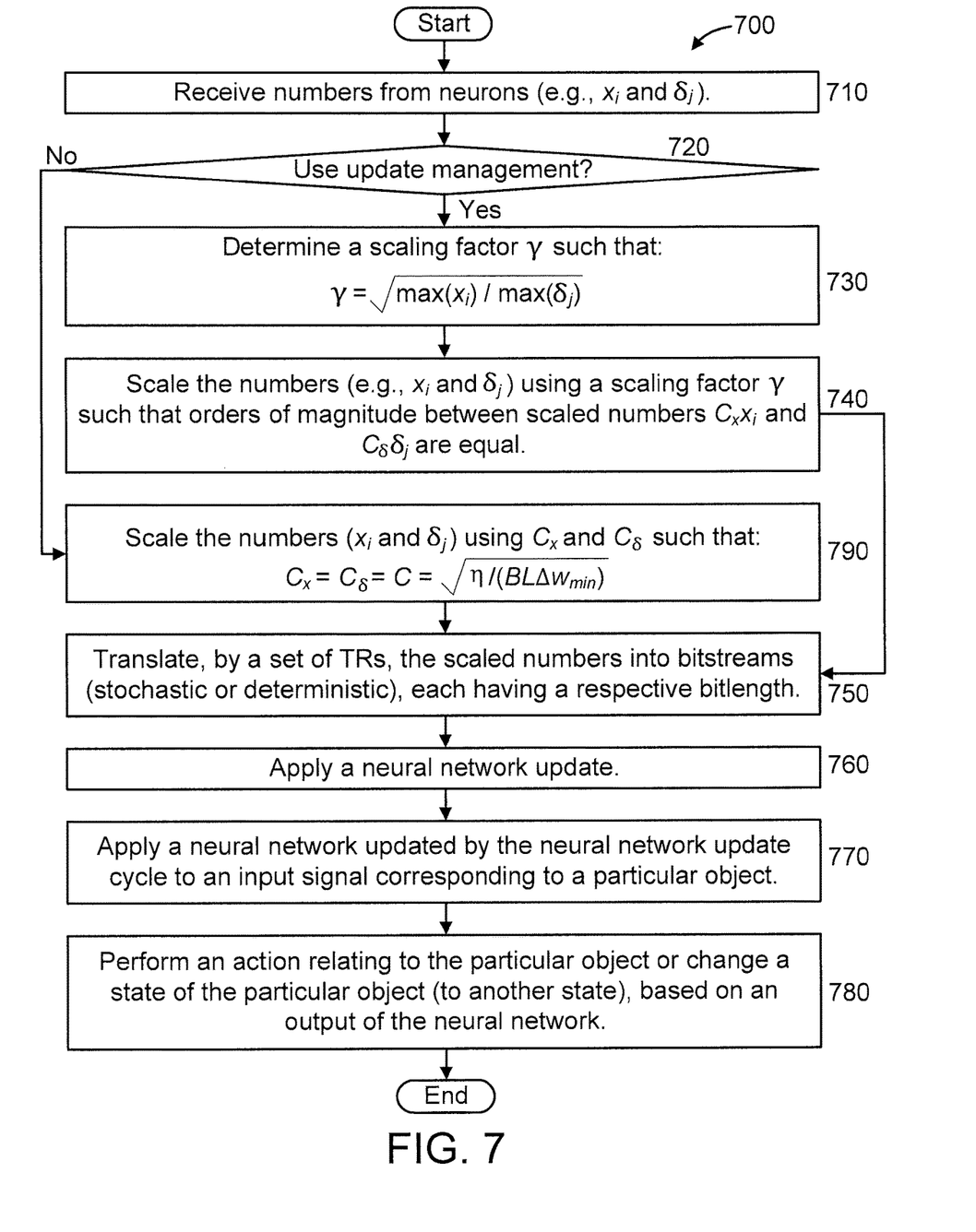
FIG. 7 shows an exemplary method for update management for a RPU array, in accordance with an embodiment of the present invention.

FIG. 7 shows an exemplary method 700 for update management for a RPU array, in accordance with an embodiment of the present invention.

At step 710, receive numbers from neurons (e.g., $x_i$ and $\delta_j$).

At step 720, determine whether to use update management. If so, then proceed to step 730. Otherwise, proceed to step 790.

At step 730, determine a scaling factor γ such that:

$$\gamma = \sqrt{\frac{\max(x_i)}{\max(\delta_j)}}.$$

At step 740, scale the numbers ($x_i$ and $\delta_j$) using the scale factor γ such that orders of magnitude between scaled numbers $C_x x_i$ and $C_\delta \delta_j$ are equal.

At step 750, translate, by a set of TRs, the scaled numbers into bitstreams (e.g., stochastic or deterministic bitstreams), each having a respective Bit Length (BL).

At step 760, apply a neural network update.

At step 770, apply a neural network updated by the neural network update cycle to an input signal corresponding to a particular object.

At step 780, perform an action relating to the particular object or change a state of the particular object (to another state), based on an output of the neural network.

At step 790, scale the numbers and ($x_i$ and $\delta_j$) using $C_x$, and $C_\delta$ such that:

$$C_x = C_\delta = C = \sqrt{\eta/(BL\Delta w_{\min})}$$

It is to be appreciated that the present invention can be applied to a myriad of applications involving neural networks including, but not limned to, speech recognition, speaker recognition, gesture recognition, audio recognition, natural language processing, computer vision, bioinformatics, and so forth. Accordingly, steps 770 and 780 can involve any of the preceding applications. Thus, relating to speech recognition, for example, an acoustic utterance can be transformed into a textual representation of the same. Moreover, further relating to speech recognition, a hardware or other type of lock, can be unlocked upon recognizing any of an uttered password, a submitted biometric identifier (e.g., a fingerprint), a speaker, an object, and so forth.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any sui table combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge sewers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable da ta processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "In an embodiment" as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B), As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of tire first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for update management for a neural network, the method comprising:
performing an isotropic update process on the neural network using a Resistive Processing Unit, the isotropic update process using a multiplicand and a multiplier from a multiplication operation,
wherein said performing step comprises scaling the multiplicand and the multiplier to have a same order of magnitude,
further comprising translating, by one or more stochastic translators, sets of numbers corresponding to neurons of the neural network into stochastic bitstreams, wherein the scaling factor is applied to an amplification factor of the one or more stochastic translators.

2. The computer implemented method of claim 1, wherein the multiplicand and the multiplier are scaled to maintain a same product before and after the scaling.

3. The computer-implemented method of claim 1, wherein said scaling step is performed in an input conditioning process applied to inputs of the isotropic update process.

4. The computer-implemented method of claim 3, wherein the input conditioning process removes false spatial correlations resulting from a difference between orders of magnitude of the multiplicand and the multiplier.

5. The computer-implemented method of claim 1, wherein the isotropic update process is performed using only a single update cycle.

6. The computer-implemented method of claim 1, wherein the Resistive Processing Unit is configured to perform an analog vector-matrix multiplication.

7. The computer-implemented method of claim 1, wherein the isotropic update process is performed on respective ones of the stochastic bitstreams having a bit length meeting one or more predetermined criterion.

8. The computer-implemented method of claim 7, wherein the one or more predetermined criterion comprise having a smallest bitstream length.

9. The computer-implemented method of claim 1, wherein the one or more stochastic translators comprise a first stochastic translator and a second stochastic translator, and wherein said scaling step comprises multiplying an amplification factor of the first stochastic translator by the scaling factor and dividing an amplification factor of the second stochastic translator by the scaling factor.

10. The computer-implemented method of claim 1, further comprising translating, by one or more deterministic translators, sets of numbers corresponding to neurons of the neural network into deterministic bitstreams.

11. The computer-implemented method of claim 10, wherein the isotropic update process is performed on respective ones of the deterministic bitstreams having a bit length meeting one or more predetermined criterion.

12. The computer-implemented method of claim 11, wherein the one or more predetermined criterion comprise having a smallest bitstream length.

13. The computer-implemented method of claim 10, wherein the scaling factor is applied to an amplification factor of the one or more deterministic translators.

14. The computer-implemented method of claim 10, wherein the one or more deterministic translators comprise a first deterministic translator and a second deterministic translator, and wherein said scaling step comprises multiplying an amplification factor of the first deterministic translator by the scaling factor and dividing an amplification factor of the second deterministic translator by the scaling factor.

\* \* \* \* \*